Oct. 19, 1937.　　　M. P. SARFATY　　　2,096,562
ENGINE PISTON CONSTRUCTION
Filed June 10, 1936
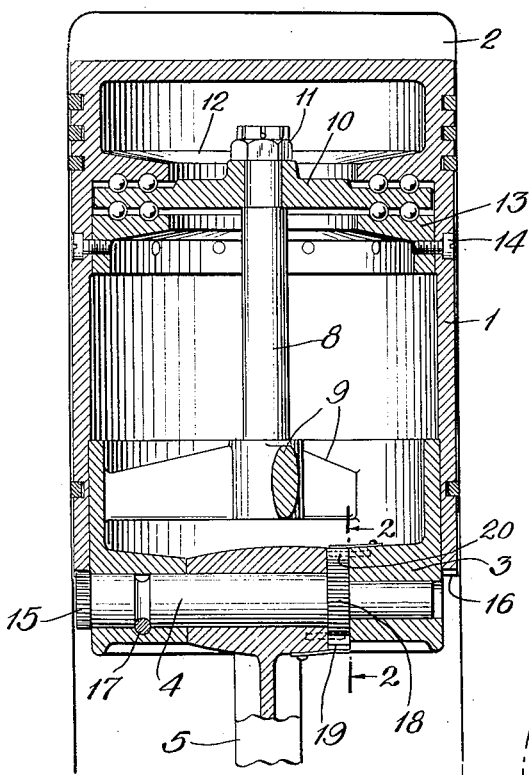
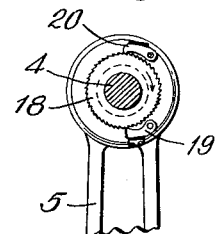
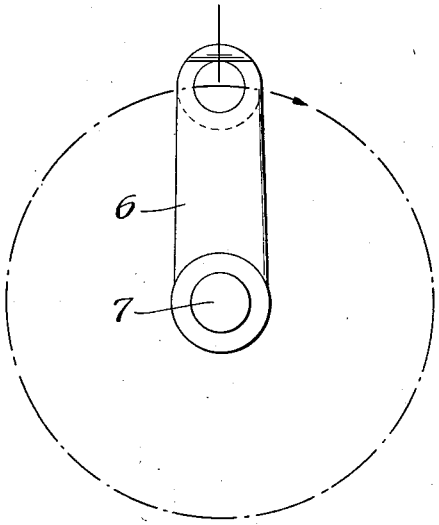
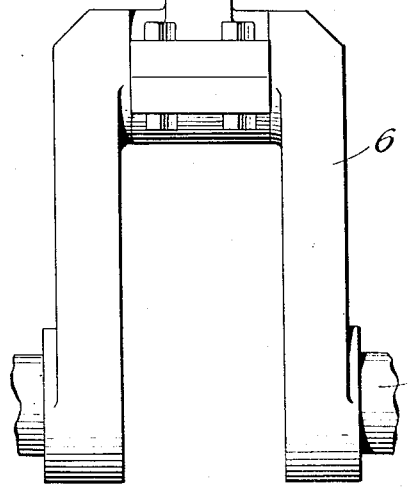
INVENTOR  
Morton P. Sarfaty  
BY Lewis J. Doolittle  
ATTORNEY Patented Oct. 19, 1937

2,096,562

UNITED STATES PATENT OFFICE 2,096,562

ENGINE PISTON CONSTRUCTION

Morton P. Sarfaty, Larchmont, N. Y.

Application June 10, 1936, Serial No. 84,526

3 Claims. (Cl. 74—23)

This invention relates to a novel construction for an engine piston of the reciprocating type, which is used where an explosive charge of gas operates a piston to produce a rotary movement of the engine shaft. The invention, however, is not limited to this particular type of engine or motive power, as will appear from the description hereinafter.

An important object of the invention is to prevent uneven wear of the piston and particularly to prevent the piston rings from sticking or becoming lodged so as to prevent or destroy, partially or entirely, their normal function of preventing leakage between the combustion chamber and crank case, causing loss of power and efficiency of the engine, dilution of the oil in the crank case, piston slap, etc.

In engines of the type referred to, a gas-tight contact is provided by means of expansible resilient piston rings mounted and carried in annular grooves in the walls of the piston and which are intended to maintain close contact with the wall of the piston cylinder and prevent leakage from the combustion chamber past the piston into the crank case or the oil from the crank case into the combustion chamber, the former resulting in a loss of power due to loss of compression and dilution of the oil while the latter causes carbon formation in the combustion chamber, as well as other undesirable results which reduce the engine efficiency, as is well known.

On account of the side thrust due to the angularity of the connecting rod and crank in operation, the wear on the piston is not evenly distributed but is concentrated on one side thereof, which prevents even and effective contact between the piston and cylinder wall, which increases the leakage with the attendant undesirable results, which are well recognized by engineers.

The present invention is directed to a construction designed to prevent the above noted and other undesirable results by providing for an even distribution of the contact surfaces and preventing the piston rings from becoming wedged or stuck in their slots, by the gummy oil or carbon deposits, etc., thus insuring their normal and efficient operation at all times.

In carrying out the above purposes of the invention, a novel construction is provided for the piston, which comprises a unit composed of two parts connected by a thrust bearing which is designed to reduce the impact or shock of the explosion as transferred to the crank shaft to produce the rotary movement of the latter. The alternating circular motion of the end of the connecting rod is utilized to produce an intermittent rotary movement of the upper part of the piston by means of a ratchet mechanism, which will be described hereinafter in connection with the description of the construction shown in the accompanying drawing as illustrative of an operative embodiment of the invention.

In the drawing, like parts in the several views have been given the same reference numeral.

Fig. 1 is a sectional elevation of a piston embodying the invention, the piston cylinder and crank being indicated and are of the conventional construction; Fig. 2 is a section taken on the line 2—2 of Fig. 1; Fig. 3 is a fragmentary detail of the lower end of the piston, taken at right-angles to and from the left-hand side of the piston shown in Fig. 1.

The upper part of the piston unit is shown at 1 mounted and operating in the usual manner in the piston cylinder, indicated by the numeral 2. This part of the piston unit is provided with the usual piston rings carried in slots in the usual manner. The lower part of the piston unit is shown at 3 and performs the function of the usual wrist pin sleeve for the wrist pin 4 carried by the upper end of the connecting rod 5, the lower end of which is connected to and operates the crank 6 in the usual manner to drive the shaft, 7.

A piston rod or connecting member 8 extends upwardly from radially extending arms 9, to which the lower part of the piston or sleeve 3 is attached. The upper end of this rod 8 is attached to a disk 10, by suitable means such as the nuts 11, and is mounted upon or between a thrust bearing, preferably a ball bearing, engaging an inwardly projecting annular flange 12 at its upper side carried by the upper part 1 of the piston and at its lower side by a similar removable annular flange 13 attached to the piston 1 by means of screws 14. The diameter of the disk 10 is slightly less than the inside diameter of the piston 1, to provide free movement of the piston 1 when rotated, as will be described, and also to provide a slight yielding to absorb the shock of the explosion and side thrust due to the angularity of the connecting rod 5 and crank 6 in operation.

At one end of the wrist pin 4 a gear 15 is mounted to engage and mesh with gear teeth or rack 16 formed around the lower end of the piston 1. A pin 17 is positioned to engage in a slot in the wrist pin 4 to hold the same against sidewise movement, permitting the same to rotate in its bearings.

A ratchet wheel 18 is mounted on the wrist pin 4 and is engaged and operated by a spring pressed pawl 19 mounted upon the upper end of the connecting rod 5 while a similar stop-pawl 20 is mounted on the projecting hub portion of the lower portion of the piston unit 3 engaging the ratchet wheel 18 to prevent reverse movement as the same is rotated by the pawl 19, in the usual manner for a pawl and ratchet mechanism.

The operation of a gas engine need not be described herein as the same is well understood. The explosion of the charge of gas in the chamber above the piston 1 causes a downward movement of the same, which movement is transmitted through the thrust bearing and disk 10 and rod 8 to the lower piston element 3 and through the connecting rod 5 to the crank 6 to rotate the shaft 7, as will be understood from the drawing.

The alternating circular movement of the upper end of the connecting rod 5 is transmitted by means of the pawl and ratchet wheel, 19—18, to the wrist pin 4, causing an intermittent rotary movement thereof which, in turn, is transmitted to the upper piston element 1 through the rack and gear, 16—15, causing an intermittent rotary movement of the same in the cylinder. This rotary movement constantly brings, successively, the entire outer surface of the piston in contact with the side of the cylinder wall against which the side thrust is exerted, thus distributing the wearing surface over the entire piston surface, and also frees or keeps the piston rings from sticking or becoming lodged in their slots and insuring their functioning to constantly contact the cylinder wall and prevent leakage past the same, as will be understood.

It will be understood that the foregoing description of the mechanism shown in the drawing is intended as illustrative of one operative embodiment of the invention and that the details of construction will be designed to meet the requirements of the particular type of engine with which it is to be used.

What I claim as new and desire to secure by Letters Patent is:—

1. A piston unit for engines comprising two parts connected by a thrust bearing, the first of said parts being rotatable with reference to the second part by means of a rack formed around the lower end thereof engaged by a gear carried by a wrist pin which is rotatably mounted in the second piston unit part and connects the same to the connecting rod, a ratchet wheel carried by the wrist pin which is rotated by means of a pawl engaging said ratchet wheel and carried and operated by the alternating circular motion of the end of the connecting rod when the engine is operated.

2. A piston unit adapted for use in an engine cylinder and comprising two co-axially and relatively rotatable parts, one of said parts being provided with piston rings normally contacting with the cylinder wall and adapted to be reciprocated therein by the expansive charge of gas, a disk engaged between and held by a thrust bearing connecting the same with the first named piston part and permitting a rotation thereof with relation to the second piston part, which latter is provided with a wrist pin rotatably mounted in bearings provided in said second piston part and connecting the same with a connecting rod operatively connected with a crank operating the engine shaft, said disk being connected with said second piston part and transmitting the reciprocating movement imparted to the first piston part thereto, a rack and gear mechanism operated by the wrist pin to impart the rotary movement thereof to said first piston part, and a ratchet wheel carried by said wrist pin and engaged by a pawl carried and operated by the end of the connecting rod to impart an intermittent rotary movement thereto as the engine is operated producing an alternating circular motion to the said end of the connection rod.

3. A piston unit for engines comprising two parts co-axially mounted and connected by a thrust bearing, the first of said parts being rotatable about the common axis with relation to the second part, a wrist pin rotatably mounted in and carried by said second part and connecting the same with a connecting rod operatively connected with a crank operating the engine shaft, a rack and gear mechanism operated by the wrist pin to impart the rotary movement thereof to the said first piston part, and a ratchet wheel carried by said wrist pin and engaged by a pawl carried and operated by the end of the connecting rod to impart an intermittent rotary movement thereto as the engine is operated and producing an alternating circular motion to the said end of the connecting rod.

MORTON P. SARFATY.